United States Patent
Bennett et al.

(10) Patent No.: US 10,479,057 B2
(45) Date of Patent: Nov. 19, 2019

(54) POLYMERIC SUBSTRATES WITH AN IMPROVED THERMAL EXPANSION COEFFICIENT AND A METHOD FOR PRODUCING THE SAME

(71) Applicant: Magma Flooring LLC, River Falls, WI (US)

(72) Inventors: Greggory S Bennett, Hudson, WI (US); Jeffrey Jacob Cernohous, Hudson, WI (US); Vance Warren Zins, Hudson, WI (US); Todd Richard Samstrom, Ellsworth, WI (US)

(73) Assignee: MAGMA FLOORING LLC, River Falls, WI (US)

( * ) Notice: Subject to any disclaimer, the term of this patent is extended or adjusted under 35 U.S.C. 154(b) by 0 days.

(21) Appl. No.: 15/552,092

(22) PCT Filed: Jan. 18, 2016

(86) PCT No.: PCT/US2016/013797
§ 371 (c)(1),
(2) Date: Aug. 18, 2017

(87) PCT Pub. No.: WO2016/115556
PCT Pub. Date: Jul. 21, 2016

(65) Prior Publication Data
US 2018/0043666 A1    Feb. 15, 2018

Related U.S. Application Data

(60) Provisional application No. 62/104,799, filed on Jan. 18, 2015.

(51) Int. Cl.
*B32B 27/28* (2006.01)
*B32B 5/26* (2006.01)
(Continued)

(52) U.S. Cl.
CPC ............ *B32B 27/28* (2013.01); *B29C 70/506* (2013.01); *B32B 5/26* (2013.01); *C08J 5/043* (2013.01);
(Continued)

(58) Field of Classification Search
CPC ...... E04C 1/00; E04C 2/22; C08K 7/14; C08J 5/18; C08J 5/043; C08J 2323/06;
(Continued)

(56) References Cited

U.S. PATENT DOCUMENTS

| 2,371,868 A | 3/1945 | Datta et al. |
| 3,668,179 A | 6/1972 | Di Biasi et al. |

(Continued)

FOREIGN PATENT DOCUMENTS

| CN | 102432959 A | 5/2012 |
| EP | 0651003 A1 | 5/1995 |

(Continued)

OTHER PUBLICATIONS

"ASTM E831-14: Standard Test Method for Linear Thermal Expansion of Solid Materials by Thermomechanical Analysis," Aug. 1, 2014 (5 pgs).

(Continued)

*Primary Examiner* — Camie S Thompson
(74) *Attorney, Agent, or Firm* — Patterson Thuente Pedersen, P.A.

(57) ABSTRACT

A substrate and method for providing a thermoplastic composite having a fiberglass mat embedded within a thermoplastic polymer. The characteristics of the fiberglass mat combined with a thermal compression bonding method allow for a substantially improved and desirable thermal expansion coefficient over conventionally filled thermoplastic substrates or other fiberglass reinforced thermoplastics.

20 Claims, 1 Drawing Sheet

(51) Int. Cl.

| | | |
|---|---|---|
| C08J 5/18 | (2006.01) | |
| C08K 3/00 | (2018.01) | |
| C08K 5/00 | (2006.01) | |
| C08K 7/14 | (2006.01) | |
| E04C 1/00 | (2006.01) | |
| C08K 3/01 | (2018.01) | |
| C08J 5/04 | (2006.01) | |
| B29C 70/50 | (2006.01) | |
| E04C 2/22 | (2006.01) | |

(52) U.S. Cl.
CPC .................. *C08J 5/18* (2013.01); *C08K 3/00* (2013.01); *C08K 3/01* (2018.01); *C08K 5/00* (2013.01); *C08K 5/0008* (2013.01); *C08K 7/14* (2013.01); *E04C 1/00* (2013.01); *E04C 2/22* (2013.01); *B32B 2260/021* (2013.01); *B32B 2260/023* (2013.01); *B32B 2260/046* (2013.01); *B32B 2262/101* (2013.01); *B32B 2264/04* (2013.01); *B32B 2264/06* (2013.01); *B32B 2264/067* (2013.01); *B32B 2264/10* (2013.01); *B32B 2307/30* (2013.01); *B32B 2307/718* (2013.01); *B32B 2307/732* (2013.01); *B32B 2419/04* (2013.01); *C08J 2323/06* (2013.01); *C08J 2323/12* (2013.01); *C08J 2327/06* (2013.01)

(58) Field of Classification Search
CPC ............ C08J 2323/12; B32B 2260/023; B32B 2260/046; B32B 2262/101; B32B 2264/10; B32B 2264/067; B32B 2264/04; B32B 2307/30; B32B 2307/718; B32B 2307/732; B32B 2419/04; B32B 5/26; B32B 2260/021; B32B 2264/06; B32B 27/28; B29C 70/506
USPC ...................................................... 428/297.4
See application file for complete search history.

(56) References Cited

U.S. PATENT DOCUMENTS

| | | |
|---|---|---|
| 3,684,645 A | 8/1972 | Temple et al. |
| 4,248,931 A | 2/1981 | Salman |
| 4,547,421 A | 10/1985 | Dunbar |
| 4,616,042 A | 10/1986 | Avakian |
| 4,767,580 A | 8/1988 | Shingo et al. |
| 4,793,956 A | 12/1988 | Nogiwa et al. |
| 4,878,970 A | 11/1989 | Schubert et al. |
| 5,118,532 A | 6/1992 | Batson et al. |
| 5,219,163 A | 6/1993 | Watson |
| 5,238,622 A | 8/1993 | Grimmer |
| 5,351,895 A | 10/1994 | Brooks et al. |
| 5,364,412 A | 11/1994 | Furukawa |
| 5,827,460 A | 10/1998 | Brentrup et al. |
| 5,965,232 A | 10/1999 | Vinod |
| 6,017,991 A | 1/2000 | Drummond et al. |
| 6,068,715 A * | 5/2000 | Yokokita ................ B24D 11/00 156/148 |
| 6,153,674 A | 11/2000 | Landin |
| 6,231,650 B1 | 5/2001 | Mallow et al. |
| 6,271,270 B1 | 8/2001 | Muzzy |
| 6,316,075 B1 | 11/2001 | Desai et al. |
| 6,387,967 B2 | 5/2002 | Muzzy |
| 6,572,697 B2 | 6/2003 | Gleeson et al. |
| 6,620,487 B1 | 9/2003 | Tonyan et al. |
| 6,743,742 B1 | 6/2004 | LaRocco et al. |
| 6,872,246 B2 | 3/2005 | Muller et al. |
| 6,907,708 B2 | 3/2005 | Merkley et al. |
| 6,861,128 B1 | 6/2005 | Naji et al. |
| 7,081,300 B2 | 7/2006 | Laurence et al. |
| 7,241,818 B2 | 7/2007 | Hemmings et al. |
| 7,361,401 B2 | 4/2008 | Desai et al. |
| 7,455,798 B2 | 11/2008 | Datta et al. |
| 7,763,345 B2 | 7/2010 | Chen et al. |
| 8,106,105 B2 | 1/2012 | Cernohous |
| 8,431,054 B2 | 4/2013 | Pervan et al. |
| 2001/0028127 A1 | 10/2001 | Hinds et al. |
| 2002/0025414 A1 | 2/2002 | Desai et al. |
| 2002/0031653 A1 | 3/2002 | Ricciardelli et al. |
| 2005/0020747 A1 | 1/2005 | Symons |
| 2005/0124763 A1 | 6/2005 | Mikami et al. |
| 2005/0166513 A1 | 8/2005 | Vanderhoef |
| 2006/0019078 A1 | 1/2006 | Osten et al. |
| 2006/0142455 A1 | 6/2006 | Agarvval et al. |
| 2007/0020747 A1 | 2/2007 | Sigworth et al. |
| 2007/0027234 A1 | 2/2007 | Sigworth et al. |
| 2008/0001429 A1* | 1/2008 | Willis .................. B29C 70/305 296/181.2 |
| 2008/0187739 A1 | 8/2008 | Baker et al. |
| 2008/0207831 A1 | 8/2008 | Feinberg |
| 2008/0287576 A1 | 11/2008 | Nichols et al. |
| 2010/0010141 A1 | 1/2010 | Nakamura et al. |
| 2010/0030003 A1 | 12/2010 | Pervan et al. |
| 2011/0177308 A1 | 7/2011 | Anderson et al. |
| 2012/0059074 A1 | 3/2012 | Adkinson et al. |
| 2012/0070646 A1 | 3/2012 | Ha et al. |
| 2012/0135203 A1 | 5/2012 | Albert et al. |
| 2013/0147090 A1 | 6/2013 | Schromm et al. |
| 2013/0189511 A1 | 7/2013 | Cernohous et al. |
| 2015/0065974 A1 | 3/2015 | Michiels et al. |
| 2015/0152650 A1 | 6/2015 | Cernohous |

FOREIGN PATENT DOCUMENTS

| | | |
|---|---|---|
| EP | 0794214 A2 | 9/1997 |
| EP | 2339092 A1 | 6/2011 |
| EP | 2754688 | 7/2014 |
| JP | 510098798 a | 8/1976 |
| JP | 04236246 A | 8/1992 |
| JP | H6-508567 | 9/1994 |
| JP | 2002-322810 | 8/2002 |
| JP | 2004-292653 A | 10/2004 |
| JP | 2005-082802 A | 3/2005 |
| SU | 1775425 | 11/1992 |
| WO | WO 01/98064 A2 | 12/2001 |
| WO | WO 2007/102825 A1 | 9/2007 |
| WO | WO 2008/094529 A1 | 8/2008 |
| WO | WO 2009/134403 | 11/2009 |
| WO | WO 2012/001091 A1 | 1/2012 |
| WO | WO 2012/016916 | 2/2012 |
| WO | WO 2013/181379 A1 | 12/2013 |
| WO | WO 2013/1796260 | 12/2013 |
| WO | WO 2014/207308 A1 | 12/2014 |
| WO | WO 2016/115556 A1 | 7/2016 |

OTHER PUBLICATIONS

"Composite Solutions, Reinforcement Guide: Transforming the World with Advanced Solutions," Mar. 1, 2011, XP 055508480, Toledo, Ohio, 43659; Retrieved from the Internet: <URL:http://www.ocvreinforcements.com/pdf/library/Composite_Solutions_Guide_100360_Efinalprintable.pdf> [retrieved on Sep. 20, 2018] (128 pgs).

Extended European Search Report for European Application No. 16738034.4, dated Sep. 28, 2018 (12 pgs).

International Preliminary Report on Patentability in International Application No. PCT/US2016/013797, dated Jul. 18, 2017 (9 pgs).

International Search Report in International Application No. PCT/US2016/013797, dated Jul. 1, 2016 (3 pgs).

Written Opinion in International Application No. PCT/US2016/013797, dated Jul. 1, 2016 (8 pgs).

"Polyvinyl Chloride (PVC) Typical Properties Generic PVC, Rigid | UL Prospector," Jan. 6, 2015, XP055502548, Retrieved from the Internet: URL: https://web.archive.org/web/20150106145449/http://plastics.ulprospector.com:80/generics/46/c/t/polyvinyl-chloride-pvc-properties-processing/sp/8 [retrieved on Aug. 28, 2018].

Chinese Office Action for Application No. 201380027887.7, dated Jan. 29, 2016 (8 pgs).

(56) References Cited

OTHER PUBLICATIONS

CN OA for App No. 201680041873.4, dated Jan. 11, 2019; 6 pgs.
CN OA for App No. 201680041873.4, dated Jan. 11, 2019; Translation—6 pgs.
EP Communication for Application No. 13 796 809.5-1303 pursuant to Article 94(3) EPC, dated Aug. 17, 2017 (7 pgs).
EP Communication for Application No. 13796809.5, dated Aug. 17, 2017.
European Response for Application No. 13 796 809.5-1303, filed Feb. 27, 2018 (6 pgs).
European Response for Application No. 13 796 809.5-1303, filed Jul. 11, 2016 (27 pgs).
European Response for Application No. 16738034.4, filed Apr. 24, 2019 (6 pgs).
Extended European Search Report for Application No. 13 796 809.5-1303, dated Dec. 15, 2016 (9 pgs).
Extended European Search Report for Application No. 16797376.7, dated Dec. 7, 2018 (11 pgs.).
International Preliminary Report on Patentability for PCT Application No. PCT/US2013/043342, dated Dec. 2, 2014 (7 pgs).
International Preliminary Report on Patentability for PCT Application No. PCT/US2016/033516, dated Nov. 30, 2017 (11 pgs).
International Search Report and Written Opinion for Application No. PCT/US2013/043342, dated Aug. 27, 2013 (9 pgs).
International Search Report and Written Opinion for Application No. PCT/US2016/56067, dated Dec. 23, 2016 (12 pgs).
International Search Report for PCT Application No. PCT/US2013/043342, dated Aug. 17, 2013 (3 pgs).
International Search Report for PCT Application No. PCT/US2016/033516, dated Aug. 17, 2016 (2 pgs).
IPRP for Application No. PCT/US2016/56067, dated Apr. 19, 2018 (7 pgs).
Office Action in U.S. Appl. No. 15/575,758, filed Feb. 19, 2019.
Partial supplementary European search report for Application No. 16797376.7, dated Sep. 5, 2018 (16 pgs.).
Naranjo C. et al., "Thermal Properties" in Plastics Testing and Characterization, Industrial Applications, Nov. 1, 2012, Hanser Fachbuchverlag, Munchen, XP 055508349, ISBN: 978-3-446-41315-3, Title page, pp. 88-94, and Abstract (10 pgs).
Response as filed in Application No. 13796809.5, dated Feb. 27, 2018.
Response as filed in Application No. 13796809.5, dated Jul. 11, 2016.
Response to CN OA dated Jan. 29, 2016 for Application No. 201380027887.7, no date indicated (12 pgs).
Response to Restriction Requirement in U.S. Appl. No. 15/575,758, filed Feb. 1, 2019.
Restriction Requirement in U.S. Appl. No. 15/575,758, dated Nov. 11, 2018.
Second Chinese Office Action for Application No. 201380027887.7, no date indicated (7 pgs).
Supplementary European Search Report, Application No. 13 796 809.5-1303, dated Dec. 8, 2015 (2 pgs).
Written Opinion for PCT Application No. PCT/US2013/043342, dated Aug. 27, 2013 (6 pgs).
Written Opinion for PCT Application No. PCT/US2016/033516, dated Aug. 17, 2016 (9 pgs).
Response for U.S. Appl. No. 15/575,758, filed May 20, 2019 (10 pgs).

* cited by examiner

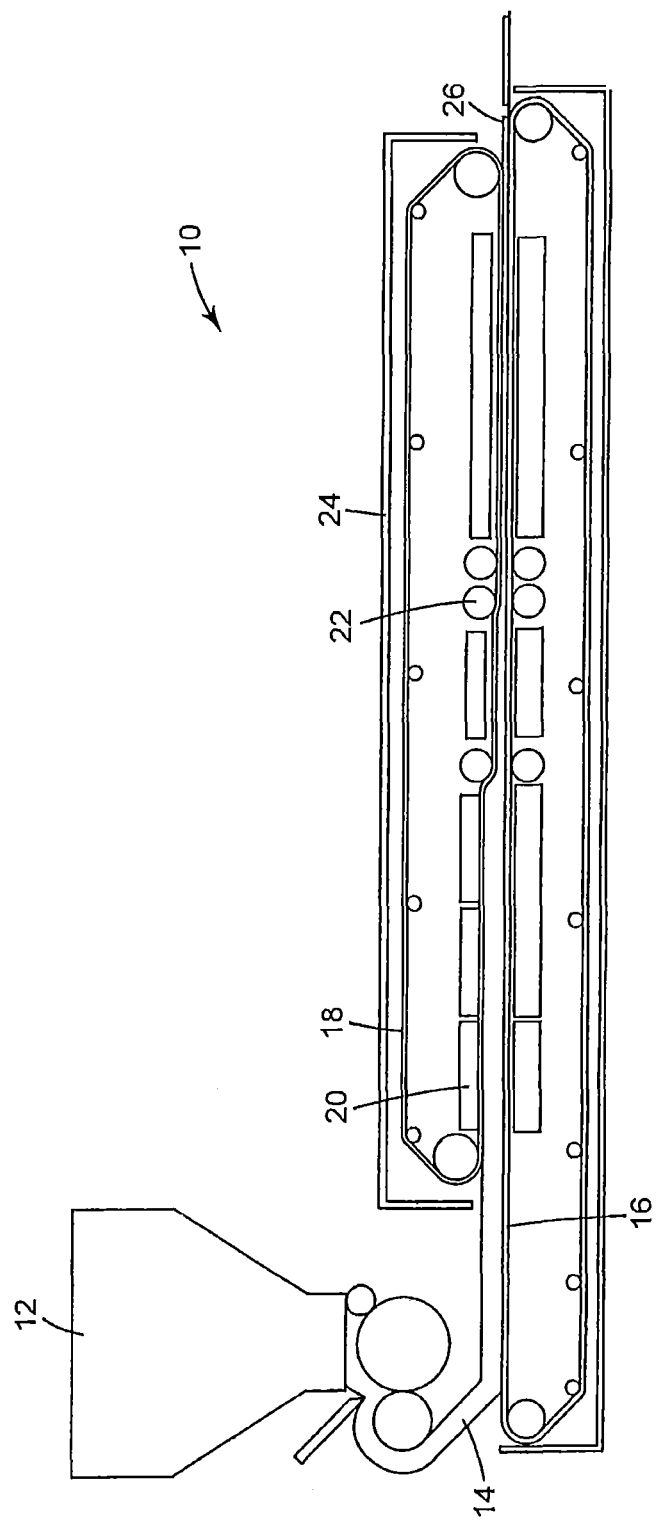

POLYMERIC SUBSTRATES WITH AN IMPROVED THERMAL EXPANSION COEFFICIENT AND A METHOD FOR PRODUCING THE SAME

CROSS-REFERENCE TO RELATED APPLICATIONS

This present application is a National Phase entry of PCT Application No. PCT/US2016/013797 filed Jan. 18, 2016, which claims priority to U.S. Provisional Application No. 62/104,799 filed Jan. 18, 2015, the disclosures of both of which are hereby incorporated by reference in their entirety.

TECHNICAL FIELD

A substrate of a thermoplastic composite having a fiberglass mat embedded within a thermoplastic polymer and a method for providing the same. The unique characteristics of the fiberglass mat combined with a thermal compression bonding method allow for a substantially improved and desirable thermal expansion coefficient over conventionally filled thermoplastic substrates or other fiberglass reinforced thermoplastics.

BACKGROUND

Thermoplastic polymers are well known, among other things, to offer the advantages of low density, good stiffness, chemical resistance, possess an ability to be formed into various shapes and relatively low cost. Unfortunately, this class of polymers is also known to possess relatively high thermal expansion values. Values found in the literature for common thermoplastics such as polyethylene, polypropylene, PVC, polyester, and nylon typically range from $50*10^{-6}$ m/(m*° C.) to $250*10^{-6}$ m/(m*° C.). Those of ordinary skill in the art of plastics fully appreciate the importance of using materials with low thermal expansion coefficients when designing a plastic article for applications that involve a change of temperature.

Conventional efforts to lower the thermal expansion coefficients of thermoplastics involve making composites by the incorporation of various fillers. Fillers can include mineral fillers such as calcium carbonate, talc, clay, volcanic ash or various nanoparticles. Fillers can also include organic fillers such as wood flour, rice hulls, or corn byproducts. It is also known to employ fibers such a carbon fibers, various polymer fibers, cellulose fibers, or glass fibers and combine them with polymer melt processing techniques to form thermoplastic composites. Such fibers may be incorporated as loose fibers or orientated fibers in the polymer or as woven or non-woven sheets. The woven or non-woven sheets are often first made into relatively thin webs of a low basis weight that have thermoplastic or thermoset polymers incorporated into them. They are then typically applied as layers to ultimately create a multilayered substrate. Unfortunately, the addition of excessive filler or fibers in an effort to achieve lower thermal expansion coefficients can compromise other properties of thermoplastic composites. For example, the resulting composite may undesirably exhibit the reduction of one or more of its weight, overall flexibility, cost, or impact strength. It can also become very difficult to mix high amounts of fillers into thermoplastics.

The thermal expansion coefficient of thermoplastic composite materials is very dependent on the thermoplastic resin being used. Thermoplastic resins such as polyethylene and polypropylene, which have high thermal expansion coefficients, are more difficult to modify into thermoplastic composites having a very low thermal expansion coefficient. Thermoplastics such as PVC and polyester have lower thermal expansion coefficients than polyolefins, however there remains a need in the marketplace for thermoplastic composites having even lower thermal expansion coefficients than presently available.

SUMMARY

This disclosure is directed to a thermoplastic composite having a fiberglass mat embedded in a thermoplastic polymer. The fiberglass mat possesses certain characteristics that enable the reduction of the thermal expansion coefficient (TEC) of the resulting thermoplastic composite. The reduction in the TEC represents a significant change from the TEC of the thermoplastic polymer from its neat form. The thermoplastic composites of this invention may exhibit TEC's of at least 3 times less than a substrate derived from a neat embodiment of the thermoplastic polymer, or in certain embodiments a TEC of $50*10^{-6}$ m/(m*° C.) or lower. In other applications, the thermoplastic composite may possess a TEC of at least 3 times less than a substrate derived from an unmodified embodiment of the same thermoplastic polymer or thermoplastic compound.

In some embodiments, the overall weight of the fiberglass mat, the number of intersections of the mat in a given area, or a combination thereof can enable the reduction of the TEC of the thermoplastic composite. Embodiments of the fiberglass mat may be described as having an open weave. The open weave of the fiberglass mat allows thermoplastic resin to be readily incorporated into it while the weight allows for materials of a desired thickness to be produced that possess very low thermal expansion coefficients. Embodiments may include fiberglass mats with a weight between 76 and 1500 g/m$^2$, or in certain applications, 150 to 600 g/m$^2$. Additionally the loose weave of the glass mat may be characterized by having between 20 and 3000 glass intersections within one square centimeter.

The thermoplastic polymer utilized to form the thermoplastic composite may vary depending upon the desired end use application. Embodiments may include polypropylene, polyethylene, polyolefin copolymers, polyvinyl chloride (PVC), polyethylene terephthalate (PET), polyamide, or combinations thereof. Recycled polymers may also be employed. For example, a polyolefin containing cellulose fibers from a hydropulping process can be used.

One method for forming the thermoplastic composite involves thermal compression bonding. Unlike other melt processing practices, thermal compression bonding does not require a precise melt state and operates low pressure and low shear. One example of thermal compression bonding is a continuous double belt press. The continuous double belt press produces a substrate of a selected width and thickness and of indefinite length. In accordance with this disclosure, the continuous double belt press is operated at low pressure so as to enable the thermoplastic polymer to melt into the open weave of the fiberglass mat while not unduly compressing the fiberglass. This results in a plastic substrate with the fiberglass web dispersed through much of the thickness of the thermoplastic composite. The thicknesses can range from thin webs having a basis weight of 500 to 1500 g/m$^2$ to thicker panels having a basis weight of more than 1500 g/m$^2$.

Another method to enable thicker substrates involves making panels having a total basis weight greater than 1500 g/m$^2$ by laminating two or more thermoplastic composites of this disclosure together in layers. Optional embodiments include placing an additional amount of thermoplastic resin between such layers of thermoplastic composite or by placing an additional amount of thermoplastic resin on either or both sides of the thermoplastic composite. Another method to enable thicker substrates is by making panels having a total basis weight greater than 1500 g/m² by taking a single fiberglass containing thermoplastic composite and subsequently placing an additional amount of thermoplastic resin on either or both sides of the fiberglass containing thermoplastic composite.

The resultant thermoplastic composites can be used alone or as a component for flooring, ceiling, roofing, wall coverings, countertops, exterior decks and other such sheet applications thermoplastic materials having low coefficients of thermal expansion are desired.

The following terms used in this application are defined as follows:

"Composite" means a mixture of a polymeric material and one or more additional materials.

"Filler" means an organic or inorganic material that does not possess viscoelastic characteristics under the conditions utilized to melt process a filled polymeric matrix.

"Panel" means a substrate having a basis weight of at least 1500 g/m².

"Reclaimed Polymeric Material" means material resulting from a recycling or reclamation process, such as for example, hydropulping waste streams, that contain a polymer, or mix of polymers, and in some cases other fillers, fibers or additives or combinations thereof.

"Substrate" means an object of a selected width and thickness and length.

"Thermoplastic composite" means a mixture of a thermoplastic polymeric material and one or more additional materials.

"Thermoplastic compound" means a mixture derived from a thermoplastic resin and one or more fillers, fibers or additives or combinations thereof.

"Thermoplastic resin" means a thermoplastic polymer that can optionally containing additional additives.

"Web" means a substrate having a basis weight of less than 1500 g/m².

DESCRIPTION OF THE DRAWINGS

FIG. 1 is a schematic of a thermal compression process suitable for practicing various embodiments of the disclosure.

DETAILED DESCRIPTION

Materials with low thermal expansion coefficients are highly desirable in a number of markets including flooring, building and construction, industrial, transportation, and automotive to name a few because a low thermal expansion coefficient allows for a material to be used over wider temperature ranges without causing problems such as bending, buckling, breaking or debonding. Those of ordinary skill in the art of plastics fully appreciate the importance of using materials with low thermal expansion coefficients when designing a plastic article for applications that involve a change of temperature.

Flooring, particularly Luxury Vinyl Tile ("LVT") applications, is a representative application where a low thermal expansion coefficient ("TEC") is desired and important. LVT applications utilize a polymeric substrate as a base layer in a multilayered laminate construction. Temperature changes within a room caused by changing conditions such as ambient air temperature changes, subfloor temperature changes, radiant sunlight warming a location of the floor, or having the flooring installed at a temperature that is significantly different than the temperature it will be used at are well known by those skilled in the art to cause problems with buckling or shrinkage or the debonding of a multilayered flooring laminate from subfloor to which it has been glued when the temperature change becomes too great. Each issue can result in aesthetically unacceptable appearances for customers desiring a decorative floor covering. In such applications the polymeric substrate used predominantly in the industry is based on mineral filled PVC and possess relatively low TECs.

Wood and wood resin composites are known for their very low thermal expansion coefficients. However, wood and wood resin composites are known to suffer from sensitivity to moisture in the form of liquid water or humidity in the air. Too much exposure to water is known to cause swelling in wood-based flooring and results in similar aesthetic issues that are described above. Most plastics are not sensitive to swelling caused by water because they are inherently non-polar in nature unless they are filled with natural fillers that can absorb water.

Replacing PVC or wood with a plastic such as polyethylene or polypropylene is especially challenging because these polymeric resins have an inherently higher thermal expansion coefficient that would need to be dramatically reduced to meet or exceed the thermal expansion coefficients found in materials used for LVT, other flooring applications, and applications such as ceiling tiles, wall coverings, decking materials and other such applications.

Despite the various challenges, for many years the global market, led by environmental concerns related to PVC or water absorption challenges related to wood, has sought replacements for PVC and wood in a wide variety of markets including flooring. Environmental concerns about PVC include its end-of-life properties where it has the potential to break down into HCl or dioxins if not properly disposed of. Additionally, phthalate plasticizers, regularly used to soften rigid PVC to make it more useful in a number of applications including flooring have also been cause for concern as they have been linked to various potential health issues and have been observed to migrate into humans. Additionally, highly filled PVC that is often used in flooring applications, is difficult to recycle and reuse. Wood products are known to suffer from decay, swelling, and rotting when exposed to too much water over time.

There have been attempts to address the noted challenges with PVC, particularly in the flooring market. For example, various alternatives have been pursued with other polymers and polymeric composites. Polyolefins such as low density polyethylene ("LDPE"), high density polyethylene ("HDPE"), polypropylene ("PP"), and other similar polyolefins offer a potential alternative because of their availability, excellent melt processability, relatively low cost, and their ability to be recycled. Similarly, reclaimed plastics based upon plastics collected from reclaimed articles such as carpet, plastic-coated papers, municipal waste, and industrial scrap have also been considered and are similarly based on LDPE, HDPE, PP, other similar polyolefins, as well as nylon, polyester and PVC and mixtures thereof.

The thermal expansion coefficients of neat LDPE and HDPE are typically about three times the thermal expansion coefficient of neat PVC. Neat PP has a lower thermal expansion coefficient that depends upon its molecular orientation and can range from 1.5 to 2.5 times the thermal expansion coefficient of neat PVC. Another challenge for polyolefins such at LDPE, HDPE and PP is that when compared to neat PVC none can be as efficiently filled as highly as PVC with fillers that effectively reduce the thermal expansion coefficient of the neat resins. This challenge is applied to reclaimed polymeric materials as well.

This disclosure is directed to solutions to market needs for cost-effective, polymeric substrates possessing exceptionally low thermal expansion coefficients for applications such as flooring, including LVT, ceiling coverings, wall coverings, exterior decking materials and the like that enables exceptionally low thermal expansion coefficients and a method of manufacturing that enables the solution as well as provides for required flatness in the resultant product. Additionally, in certain embodiments, reclaimed plastic resins enable especially desirably low manufacturing costs and environmental sustainability.

Literature values for LDPE and HDPE TEC are typically about 195 to $250*10^{-6}$ m/(m*° C.). PP is reported to range from 100 to $180*10^{-6}$ m/(m*° C.). PVC has a reported TEC of about 65 to $130*10^{-6}$ m/(m*° C.). It has generally been reported that use of mineral fillers, glass fibers, glass fabrics, and certain plastic mats can reduce the TEC of polyolefins and PVC. PVC compositions used for flooring applications typically have a TEC of approximately 50 to $80*10^{-6}$ m/(m*C). Achieving a TEC in this range using resins such as LDPE, HDPE, PP or other similar polyolefins or using reclaimed plastics from the same has proven to be very difficult and has largely precluded the broad introduction of non-PVC flooring materials to the market.

The flooring industry's requirement for plastic flooring to have both a low TEC and little or no susceptibility to swelling caused by moisture has also largely precluded the utilization of natural fiber fillers because of their tendency to swell when exposed to water. Such a combination of requirements requires inorganic fillers to be used. Loading inorganic fillers into LDPE, HDPE, PP or other similar polyolefins at very high loading levels makes the resultant thermoplastic composite possess a high density and generally poor mechanical properties. In fact, it has now been discovered that the reduction of the TEC of LDPE-based resins can only be reduced to about $80*10^{-6}$ m/(m*° C.) through the addition of fillers.

Including additional fillers to further reduce the TEC in polyolefins results in materials that are simply of too low of mechanical properties to be broadly useful and the addition of further filler has also been found to enable little further lowering of the TEC. Numerous organic fillers and inorganic fillers have been investigated both with and without fiberglass mats and various plastic mats that were intended to reduce the TEC. One embodiment of this disclosure offers a type of fiberglass mat that when properly combined with a thermoplastic composite can drive the TEC to less than $10*10^{-6}$ m/(m*° C.) after the composite has been allowed to relax by heating to 70° C. at least one hour of time before finally measuring the TEC. The low TEC values are achieved while maintaining suitable mechanical properties, such as modulus and impact strength.

Substrates embodied in this disclosure comprise thermoplastic composites having a fiberglass mat that reduces the TEC dramatically when compared to the same thermoplastic composite in the absence of the fiberglass mat. Embodiments may include fiberglass mats with a weight between 76 and 1500 g/m², or in certain applications, 150 to 600 g/m². In other embodiments, long glass fibers such as the flexible glass available from Huntingdon, such as 8610 flexible glass, at weights of 150 to 460 g/m². Such fiberglass mats also have a characteristic of being from about 1 mm to 10 mm in height when a representative 20.3 cm by 20.3 cm section of the fiberglass mat is placed between two sheets of thick paper and loaded with a 228 gram weight that also has the dimensions of being 20.3 cm by 20.3 cm. Another characteristic of the fiberglass mat is that it has a relatively open weave. One method of determining if a fiberglass mat has an open weave is by counting the number of intersections between individual fibers in the fiberglass mat over a specific area. For example, the number of fiberglass intersections measured in a 1 cm×1 cm square section is typically between 20 and 3000, and in some applications between 70 and 2000.

A continuous filament mat ("CFM") can be utilized as the fiberglass mat described in this disclosure. A CFM is a reinforcing mat composed of continuous fiber strands that are spun to produce a random fiber orientation and bulk. The CFM uses continuous long fibers rather than short chopped fibers. Continuous filament mat is produced by dispensing molten fiberglass strands directly onto a moving belt in a looping fashion. As the fiberglass fiber cools and hardens and a binder is applied to hold the filaments in place. Such CFM's are commercially available from Huntingdon Fiberglass Products, LLC, Huntingdon, Pa. Those of ordinary skill in the art with knowledge of this disclosure are capable of selecting a particular fiberglass mat or CFM to meet desired finished product characteristics.

These characteristics of the fiberglass mats of this disclosure provide a volumetric characteristic that allows a thermoplastic resin or thermoplastic compound to fill into or flow into the open areas not occupied by the fibers. The characteristic allowing for the thermoplastic to fill the open spaces within the fiberglass mat may be especially valuable for plastic panels having a basis weight greater than 1500 g/m². Plastic panels having a basis weight greater than 1500 g/m² are usually at least 1 mm thick and typically about 1.5 mm thick. For such thick plastic panels to have a low TEC it has been found that it is desirable for the fiberglass mat to be included in as much of the panels' thickness as possible and that the glass fiber is well embedded into the thermoplastic. It has also been found that increasing the basis weight of the reinforcing fiberglass mat of the characteristics described reduces the TEC of the resultant thermoplastic composite panel so long as the fiberglass mat is well embedded in the thermoplastic composite.

One of ordinary skill in the art with knowledge of this disclosure will recognize that in certain embodiments the overall thickness of the fiberglass mat as well as the number of glass intersections per square centimeter should be selected to allow the fiberglass mat to become sufficiently embedded into the thermoplastic polymer. A fiberglass web that is not well embedded into the thermoplastic resin will result in a panel that will be weak and have a tendency to split within the fiberglass web. Consequently, another aspect of this disclosure is to provide laminates of the plastic panels of the invention so as to enable even higher basis weight panels having a low TEC. Another aspect of this disclosure is to use the plastic panels of this invention as a low TEC core onto which additional thermoplastic resin or thermoplastic compound can be coated onto either the top side, the bottom side or both sides in varying amounts. Yet, another aspect of this disclosure is to use the plastic panels of this invention as substrate materials that can have decorative layers added to them to enable decorative floor coverings, wall coverings, ceiling coverings and other such articles. Various other combinations of the plastic panels of this invention may be utilized for a select end use application.

Additionally, it has been found that the fiberglass mats of this disclosure are effective with different types of thermoplastic polymers and their respective compounds in enabling plastic panels having low TECs. Any thermoplastic polymer may be used with the embodiments of this disclosure. Non-limiting examples of thermoplastic polymer suitable for this disclosure include polypropylene, polyethylene, polyolefin copolymers, polyvinyl chloride, polyethylene terephthalate, polyamide, a polyolefin from a hydropulping process, or combinations thereof. Thermoplastic resins and thermoplastic compounds made from such thermoplastic polymers or combinations thereof are also included.

In alternative embodiments, reclaimed thermoplastics such as a reclaimed thermoplastic polyolefin or thermoplastic polyolefin compound or a thermoplastic PVC resin or a thermoplastic PVC compound may be employed. For example, in one embodiment, the reclaimed plastic is a reclaimed thermoplastic polyolefin compound that may contain a filler. The reclaimed polyolefin may be a material resulting from a recycling or reclamation process that contains a mix of polyolefins, and, in certain embodiments, cellulosic material having a high aspect ratio. One example is the hydropulping process used primarily for recovering cellulosic material from plastic coated paper products. An example of a hydropulping process can be found in U.S. Pat. No. 5,351,895, herein incorporated by reference in its entirety. In certain embodiments, the reclaimed polymeric material may be included in the substrate in amounts up to 99 wt %.

In certain embodiments, the thermoplastic resin or thermoplastic compound have properties that allow for it to properly flow into the open void spaces within the fiberglass. Specifically, the thermoplastic may be ground to a small particle size so that prior to thermal compression bonding it is able to physically penetrate into the some of the open areas within the fiberglass mat. Generally, the smaller the particle size of the thermoplastic resin, the better it flows into the open spaces within the fiberglass mat before it is melted. However, particle sizes that are too small can result in excessive dust and be difficult to handle in a manufacturing setting. One of ordinary skill in the art with knowledge of this disclosure is capable of selecting a particular particle size to match the properties of the fiberglass mat.

Typically, the pellet size is about 0.25 cm to 0.5 cm while in other embodiments the powder size is 0.05 cm to 0.2 cm. Various ranges and combinations of sizes can be utilized. Those skilled in the art are aware of the limits of thermoplastics being ground to too small of a particle size or using pellets of too large of a particle size.

In an optional embodiment, various additives can be added to the powders and pellets of the thermoplastic polymer. Such additives can be used to impart additional characteristics such as color, flame resistance, lighter weight, lower cost and the like. The fillers can be organic or inorganic in nature. When added to the powders or pellets it is preferred that they are of a similar size to the powder or pellet to help ensure that the dry blend is well mixed. It is also possible to add a liquid to the dry blends to help minimize dust and optimize mixing.

The thermoplastic polymer should have an appropriate melt flow index to ensure an adequate dispersion and consolidation of the thermoplastic polymer throughout the fiberglass containing polymeric composite. Materials having too low of a melt flow index do not flow well when turned into their liquid state. As a result, such materials are not effective at filling in the open spaces that exist within the reinforcing fiberglass mat of this disclosure and the fiberglass mat is not well embedded in the resultant panel. Additionally, if inadequate flow occurs, the reinforcing fiberglass mat is not embedded in the thermoplastic as well and does not enable as significant of a reduction in the resultant panels' TEC. MFI values may range from at least 0.1 to at least 20.0 g/10 minutes and in certain applications greater than 25 g/10 minutes.

Thermal compression bonding is capable of producing a thermoplastic composite containing a fiberglass mat of this disclosure that possesses a lower TEC over the neat thermoplastic polymer. In certain embodiments, continuous thermal compression bonding on a double belt press enables the production of thermoplastic composites having very low TECs. Unlike conventional polymer thermal processing methods such as extrusion and injection molding, the continuous double belt press ("CDBP") process does not require precise melt state properties to create the resultant substrate.

A CDBP is a thermal compression manufacturing process that is capable of being used in a continuous manner and applies the temperature needed to sufficiently melt the thermoplastic polymer and simultaneously applies relatively low pressures and low shear stresses. In operation, the CDBP process can scatter a thermoplastic pellet or powder onto the fiberglass mat and enables it to flow into the fiberglass mat with relatively little pressure or shear. The CDBP can also be used to scatter a thermoplastic pellet or powder onto a continuous non-stick belt before the fiberglass web is placed onto the belt. The CDBP process results in a very flat thermoplastic composite that varies in thickness less than +/−0.1 mm over a 1 meter distance. The CDBP process can also enable very flat materials over smaller distances to achieve the specification of flatness in the flooring industry, with gaps measured over a 45 cm distance of less than 0.035 cm. Examples of times, temperature and pressures used to enable the plastic panels of this disclosure can be found in the examples section. Those skilled in the art will know other process conditions that can also be utilized to enable similar results with a CDBP process.

A schematic of a continuous double belt process 10 is depicted in FIG. 1. A pellet scattering device 12 is employed to spread the desired polymeric composite as pellets 14 onto an extended lower belt 16 and onto a fiberglass mat (not shown) placed onto the belt by an unwinding station (not shown). An upper belt 18 comes into contact with the scattered pellets 14 on the lower belt 16 near a heating zone 20. The heat melts or partially melts the pellets 14 and bonds them together (not shown) with the fiberglass mat (not shown). Nip rolls 22 apply compressive forces to assist in the processing of the pellets 14 to a substrate 26 of indefinite length and may help orient high aspect ratio fillers to impart useful properties. An annealing zone 24 is used to finalize the process before the substrate exits from belts 16 and 18. Such an apparatus is available from Sandvik-TPS of Goppingen, Germany. Upon take off of the panel of indefinite length from the continuous double belt press, the substrate is divided into smaller substrates for end use applications.

The use of a CDBP permits the unwinding of a web of a fiberglass mat onto a continuous non-stick web or belt from which the resultant thermoplastic composite can subsequently be produced. Additionally, in this process, it is possible to scatter powders or pellets of thermoplastic resin or thermoplastic compound on top of the reinforcing fiberglass mat after it has been placed onto the continuous non-stick web and the non-stick web can be substantially vibrated to help enable the thermoplastic material to fill into the fiberglass web.

In another embodiment, it is also possible to scatter powders or pellets of thermoplastic resin or thermoplastic compound onto the non-stick continuous web before the reinforcing fiberglass mat is applied to the web and to subsequently scatter powders or pellets of thermoplastic resin or thermoplastic compound on top of the fiberglass web. Varying amount of thermoplastic powders or pellets can be added to the top or bottom of the fiberglass mat to result in plastic panels of varying basis weights. The nature and type of thermoplastic polymers being used for the various layers can be different. Basis weights may range from 500 g/m$^2$ to 15,000 g/m$^2$, and in certain applications 1500 g/m$^2$ to 7,000 g/m$^2$.

Those of ordinary skill in the art recognize that pressure applied during the thermal compression bonding process is a variable that has an impact on the properties of the resulting substrate. Sufficient pressure is applied after the thermoplastic polymer is melted or substantially softened to consolidate the thermoplastic into a thermoplastic panel having very few voids and to embed the fiberglass web into the thermoplastic composite. Those of ordinary skill in the art will also recognize that too much pressure may compress the fiberglass mat into a very thin state and thereby negatively impact the desired low TEC.

The thermoplastic polymer chosen may impact the ability to sufficiently embed the fiberglass into the thermoplastic polymer mat during thermal compression bonding. For example, certain thermoplastic polymers with high TEC values may achieve better results in final TEC values in the thermoplastic composite than using a filled thermoplastic compound with a lower TEC value. It is believed that unfilled thermoplastic polymers possess an increased ability to flow into voids within the fiberglass mesh and therefore can be more effective at attaining lower TEC values in the finished substrate. In certain embodiments, the thermoplastic composite panels of this disclosure have been found to have TECs as low as $8*10^{-6}$ m/(m*° C.). Such a value is similar to the TEC of wood. Such a dramatic improvement of the TEC renders the resulting articles of far greater utility in a number of markets including flooring and LVT applications in particular, ceiling covering, acoustic sound dampeners, wall coverings and other such applications.

In an alternative embodiment, a thin thermoplastic composite substrate, for example of approximately 1.5 mm thick, of the above described fiberglass mat well embedded in a polyolefin thermoplastic compound is prepared. This thin thermoplastic composite substrate with opposing surfaces is subsequently coated or bonded on both opposing surfaces with a thermoplastic resin or thermoplastic compound. Such a process can result in panels possessing very low TECs and very good flatness. Alternatively two or more of the thin thermoplastic composite substrates can be laminated together. Pre-making such a thin sheet and subsequently coating it with further thermoplastic resin or thermoplastic compound or alternatively laminating the thin sheets together is capable of achieving substrates with very low TEC values and very good flatness values.

The resulting substrates may be treated to enable bonding or attachment of additional layers to create a multilayered article. Non-limiting examples of such methods known in the art include plasma treatment, corona treatment, silane treatment, use of primer materials or heat treatment.

The substrates of this disclosure exhibit desirably low TEC properties not previously recognized or achieved by those of ordinary skill in the art. TECs of the resulting thermoplastic composite may range from about one half of the thermoplastic panels' unmodified TEC to about one tenth of the thermoplastic panels' unmodified TEC. The TECs of the substrate were measured according the Thermal Expansion Coefficient test. The test is performed by cutting nominally 125 cm square samples, measuring their length and width with a micrometer, heating them to 70° C. for one hour and then allowing them to cool to room temperature for at least one hour. Their length and widths were again measured with a micrometer to determine any contraction. The samples were then again heated to 70° C. and after one hour their length and width was measured immediately after removing them from the oven to determine their TEC. Certain embodiments demonstrated a TEC of $35*10^{-6}$ m/(m*C) or lower. Other embodiments demonstrate a TEC of at least 3 times less than a substrate derived from a neat embodiment of the thermoplastic compound.

EXAMPLES

Comparative Example #1

A reprocessed LDPE, coating grade product LDPE-W-5, available from United Plastics Recycling of Montgomery, Ala. available in pellet form and having an MFI of 2.6 g/10 minutes was processed using the CDBP. The MFI measurement was done in accordance with ASTM D1238-10 Procedure A using a Tinius Olsen Extrusion Plastometer. The Tinius Olsen Extrusion Plastometer was set to a barrel temperature of 190° C. and a 2.16 kg load was applied. The continuous double belt press was a made by Sandvik-TPS of Goppingen, Germany and has three heating zone each having a length of approximately 5 meters and three cooling zones each having a length of approximately 5 meters. The total length of combined heating and cooling zones, which includes length for nip rollers and other mechanical equipment is approximately 27 meters. Prior to the heating and cooling zones are positioned two scattering units that are capable of applying a precise amount of powder or pellets across a distance of up to 1.5 meters.

The materials were scattered unto a Teflon-coated belt that was moving at 4 m/minute. In this example only one scattering unit was used. The CDBP was set such that temperature in heating zone one was 250° C. for both the top and bottom heaters, the second heating zone was set to a temperature of 240° C. for both the top and bottom heaters, the third heating zone was set to 180° C. for both the top and bottom heaters. Immediately following the heating zones a 3 bar pressure was set to a 61 cm powered nip roller. Immediately following the application of nip pressure, the sample entered the first cooling zone which was set to 40° C. for both the top and bottom coolers while the second cooling zone was set to 20° C. for both the top and bottom coolers.

The resultant plastic panel had a thickness of 3.2 mm and a basis weight of 2895 g/m2. The TEC of the samples were tested in accordance with the Thermal Expansion Coefficient Test described above. Two samples were measured and an average of all measurements was used to determine the data reported in Table 1.

Comparative Example #2

The same LDPE as Comparative Example #1 was used but in this case it was pulverized into a powder form and subsequently scattered onto the Teflon-coated belt of the CDBP. All of the CDBP process conditions and the test methods were the same as described in Comparative Example #1. The resultant plastic panel had a thickness of 3.1 mm and a basis weight of 2763 g/m2. The TEC of two samples were measured using the Thermal Expansion Coefficient test and an average of all measurements was used to determine the data reported in Table 1.

Example #1

The same LDPE as described in Comparative Example #2 was used. In this example two scattering units were used. The first scattering unit applied the pulverized LDPE powder directly to the Teflon-coated belt. To this scattered powder a 305 g/m² flexible fiberglass from a continuous strand roll, product 8610 commercially available from Huntingdon Fiberglass Products, LLC, of Huntingdon, Pa., was applied. Subsequently, the second scattering unit applied another layer of pulverized LDPE. The vibrating table of the CDBP was turned on following the second scattering unit. The amount of pulverized LDPE applied was approximately the same but was optimized so as to enable a relatively flat resultant plastic panel. All of the CDBP process conditions and the test methods were the same as described in Comparative Example #1. The resultant panel was approximately 3.05 mm in thickness and had a basis weight of 2956 g/m². The TEC of two samples were measured using the Thermal Expansion Coefficient test and an average of all measurements was used to determine the data reported in Table 1.

Example #2

The same LDPE and method of applying it to the CDBP as described in Example #1 was used. In this case a 229 g/m² semi-rigid fiberglass from continuous strand roll, product 8635D2 commercially available from Huntingdon Fiberglass Products, LLC, of Huntingdon, Pa., was used. All of the CDBP process conditions and test methods were the same as described in Comparative Example #1. The resultant plastic panel had a thickness of approximately 3.05 mm and a basis weight of 2823 g/m2. The TEC of two samples were measured using the Thermal Expansion Coefficient test and an average of all measurements was used to determine the data reported in Table 1.

TABLE 1

| Example | Description | Basis Weight (g/m2) | Thickness (mm) | TEC *10-6 m/(m*C) | Shrinkage |
|---|---|---|---|---|---|
| Comparative Example #1 | LDPE Pellets | 2895 | 3.2 | 212 | -0.02% |
| Comparative Example #2 | LDPE Powder | 2763 | 3.1 | 206 | -0.03% |
| Example #1 | LDPE Powder/ 305 g/m2 fiberglass/ LDPE Powder | 2956 | 3.05 | 20 | -0.04% |
| Example #2 | LDPE Powder/ 228 g/m2 fiberglass/ LDPE Powder | 2823 | 3.05 | 34 | -0.04% |

Comparative Example #3

A reprocessed LDPE containing a cellulose fiber filler, product code 3000282 a densified granulate and having an MFI of 0.3 g/10 minutes was used. The densified granulate was converted to a pellet form by initially pulverizing the granulate and then processing the pulverized powder through a Pallmann Palltruder PF250 using a die with a hole diameters of approximately 3.6 mm. The heating zone #1 of the CDBP was set to 230 C for the top and bottom ovens, heating zone number 2 was set to 210° C. for the top and bottom ovens, heating zone 3 was set to 150° C. for the top and bottom ovens and the cooling conditions were the same as described in comparative example #1. The three 15 cm diameter nip rollers located within the heating zones were all set to 3 bar of pressure. The 61 cm diameter powered nip roller following the heating zones was set to 2 bar of pressure and the belt speed was set for 3 meters/minute. The resultant plastic sheet had a thickness of 6.1 mm and a basis weight of 7975 g/m2. The properties of the resultant thermoplastic composite can be found in Table 2.

Comparative Examples 4-11

Comparative Examples 4-11 investigated the impact of various fillers to reduce TEC. These examples were made in a similar manner as Comparative Example #3. However in this case varying amounts of fillers were blended with the pulverized LDPE before they were placed into the Pallmann Palltruder for conversion to pellets. The calcium carbonate was obtained from GLC 1012d from Great Lakes Calcium of Green Bay, Wis. The wood flour was product 4010 maple from American Wood Fibers of Schofield, Wis. The talc, product Silverline 002, and volcanic ash were commercially available from Imerys Corporation. The amounts of filler and the resultant properties of the thermoplastic composites are shown in Table 2.

TABLE 2

| Comparative Example | LDPE (wt %) | Calcium Carbonate (wt %) | Wood Flour (wt %) | Talc (wt %) | Volcanic Ash (wt %) | Basis Weight (g/m2) | Thickness (mm) | TEC * 10-6 m/(m * C) | Shrinkage (%) |
|---|---|---|---|---|---|---|---|---|---|
| 3 | 100 | 0 | 0 | 0 | 0 | 7975 | 6.1 | 94 | -0.21 |
| 4 | 60 | 20 | 20 | 0 | 0 | 4951 | 4.3 | 96 | -0.25 |
| 5 | 50 | 20 | 30 | 0 | 0 | 5291 | 4.5 | 82 | -0.19 |
| 6 | 50 | 30 | 20 | 0 | 0 | 5700 | 4.5 | 88 | -0.16 |
| 7 | 60 | 20 | 20 | 0 | 0 | 5669 | 5.0 | 96 | -0.27 |
| 8 | 50 | 20 | 30 | 0 | 0 | 6114 | 5.2 | 82 | -0.22 |
| 9 | 75 | 0 | 0 | 25 | 0 | 3594 | 3.2 | 91 | -0.33 |
| 10 | 50 | 0 | 0 | 50 | 0 | 3726 | 3.0 | 90 | -0.27 |
| 11 | 40 | 0 | 0 | 0 | 60 | 4836 | 3.15 | 90 | -0.25 |

Comparative Examples 12-24

Comparative Examples 12-25 investigated the ability of different glasses in reducing the TEC. These examples were made in a manner similar to Example #2. However, in this case a pulverized LDPE containing a cellulose fiber filler, product code 3000282 a densified granulate and having an MFI of 0.3 g/10 minutes was used instead of the LDPE of Example #2. The different types of fiberglass investigated included the products from Dryvit Corporation of West Warwick, R.I.: Standard (102 g/m$^2$), Standard Plus (142 g/m$^2$), and Intermediate (284 g/m$^2$). Also included were fiberglass materials from Cross Country Supply that were 165, 237, 284, and 474 g/m$^2$ respectively. Also investigated were fiberglass webs from Fibre Glast Developments Corporation and included product 241-B a 47 g/m$^2$ fabric, product 262-C a 95 g/m$^2$ fabric, product 259-A a 142 g/m$^2$ fabric, product 246-C a 39 g/m$^2$ glass scrim, product 573-C a 71 g/m$^2$ tight weave glass fabric, and product 1094-C, a 213 g/m$^2$ twill weave glass fabric. Comparative Examples 12-24 20 did not possess glass intersections in the range of 20 to about 3000 fiberglass intersections per cm$^2$ or the thickness from about 1 mm to 10 mm in height when a when measured in accordance with this disclosure. For these examples LDPE pellets described in Comparative Example 3 were pulverized to enable a powder that was subsequently scattered using two separate scattering units as described in Example #1. The conditions of the CDBP were set so that the first heating zone was set to 190° C. on both the top and bottom, heating zone two was set at 190° C. on both the top and bottom, heating zone three was set to 150° C. on both the top and bottom. Both of the cooling zones were set at 20° C. on both the top and the bottom. The first 15 cm diameter nip roller in the CDBP was set at 0.1 bar, the second 15 cm diameter nip roller was set to 1 bar, the third 15 cm diameter nip roller was set at 2 bar and the 61 cm diameter powered nip roller immediately following the heating zone was set to 1.5 bar and the line speed was 3 m/min. The LDPE powder was scattered using both of the scattering units on the CDBP as described in Example #1. The properties of the resultant thermoplastic composites are shown in Table 3.

reclaimed PP having an MFI of 4.6 g/10 minutes and commercially available from Wellmann Recycled Plastics of Johnsonville, S.C. The PVC was a reclaimed cellular tan PVC commercially available from Jamplast of Mount Vernon, Ind. The expanded ash was Sil 35 BC commercially available from Silbrico Corporation of Hodgkins, Ill. The LDPE was the reclaimed source described in Comparative Examples 12-24. The wood flour was the same wood flour as described in Comparative Examples 3-11.

All of the thermoplastic compounds for Examples 3-7 were made by first pulverizing the plastic into a powder. When fillers were used, the fillers we subsequently blended with the pulverized plastic powders to obtain a uniform mixture. The powders or powder blends were then fed into the Pallmann Palltruder to make pellets where were subsequently pulverized into a powder form to be used with the CDBP. The flexible fiberglass from a continuous strand roll and was Huntingdon product 8610 at 457 g/m$^2$ and commercially available from Huntingdon Fiberglass Products, LLC, of Huntingdon, Pa. The thermoplastic resin powders were applied to the CDBP and combined with the flexible fiberglass as described in Example 1. For examples 3-6 the CDBP line speed was 3 m/minute. For Example 3 all of the oven temperatures were set to 205° C. on both the top and bottom. The cooling ovens were set as described in Comparative Example 1. The third 15 cm diameter nip roller was set to 4.3 bars, the 61 cm diameter powered nip roller was set to 1.8 bar and the fourth 15 cm diameter nip roller that immediately follows the powered nip roller was set to 4.3 bar. For Example 4 the first heating zone oven was set to 225° C. for both top and bottom. The second heating zone was set to 180° C. for both top and bottom. Heating zone 3 was set to 140° C. top and bottom. The cooling zones were set the same as Example 3. All three of the 15 cm diameter nip rollers found in heating zones 1 to 3 were all set to 3.5 bars. For Example 5 the first heating zone oven was set to 225° C. for both top and bottom. The second heating zone was set to 165° C. for both top and bottom. Heating zone 3 was set to 130° C. top and bottom. The cooling zones were both set to 20° C. top and bottom. The second and third 15 cm diameter nip rollers were both set to 3 bars and the 61 cim diameter powered nip roller was set to 3.5 bar.

For Example 6 all of the conditions were the same except for the setting for the third heating zone which was set to 120° C. top and bottom. The amount of scatter was adjusted to enable the resultant thicknesses shown in Table 4 and the continuous fiberglass mat was approximately centered in the middle of the panels' thickness. For Example 7 the PVC was

TABLE 3

| Comparative Example | Glass Fabric Supplier | Product Name | Basis Weight (g/m2) | Thickness (mm) | TEC * 10−6 m/(m * C) | Shrinkage (%) |
|---|---|---|---|---|---|---|
| 12 | Dryvit | Standard | 3053 | 3.05 | 104 | −0.32 |
| 13 | Dryvit | Standard Plus | 2937 | 2.95 | 96 | −0.33 |
| 14 | Dryvit | Intermediate | 3220 | 3.1 | 82 | −0.29 |
| 15 | Cross Country | 165 g/m2 | 3310 | 3.3 | 112 | −0.23 |
| 16 | Cross Country | 237 g/m2 | 3480 | 3.4 | 88 | −0.23 |
| 17 | Cross Country | 284 g/m2 | 3487 | 3.35 | 90 | −0.22 |
| 18 | Cross Country | 474 g/m2 | 3680 | 3.5 | 80 | −0.24 |
| 19 | Fibre Glast | 241-B | 3046 | 3.1 | 95 | −0.16 |
| 20 | Fibre Glast | 262-C | 2987 | 3.1 | 90 | −0.21 |
| 21 | Fibre Glast | 259-A | 2981 | 3 | 79 | −0.2 |
| 22 | Fibre Glast | 246-C | 2842 | 2.9 | 91 | −0.25 |
| 23 | Fibre Glast | 573-C | 2929 | 3 | 93 | −0.19 |
| 24 | Fibre Glast | 1094-C | 3078 | 3.1 | 96 | −0.21 |

Examples 3-7

In Examples 3-7, various thermoplastic resin compounds were investigated in combination with the continuous fiberglass mat and the continuous thermal bonding process. The HDPE compound included a reclaimed HDPE of mixed color and an MFI of 0.5 g/10 minutes commercially available from Wyocomp of Cheyenne, Wyo. The PP was a pulverized to a powder and blended with the expanded ash powder. Four percent of epoxidized soybean oil was also added to the blend. It was subsequently scattered onto the CDBP and unlike the other samples was not first made into a pellet before being pulverized. In Example 7 a flexible fiberglass from a continuous strand roll commercially available as Huntingdon product 8610 at 305 g/m² from Huntingdon Fiberglass Products, LLC, of Huntingdon, Pa. was used. The properties of the resultant thermoplastic composites are shown in Table 4.

TABLE 4

| Example | LDPE (wt %) | HDPE (wt %) | PP (wt %) | PVC (wt %) | Wood Flour (wt %) | Expanded Ash (wt %) | Fiberglass | Basis Weight (g/m2) | Thickness (mm) | TEC * 10-6 m/(m * C) | Shrinkage (%) |
|---|---|---|---|---|---|---|---|---|---|---|---|
| 3 | 0 | 75 | 0 | 0 | 25 | 0 | Hundington 8610 457 g/m2 | 3442 | 3.3 | 23 | −0.02 |
| 4 | 0 | 0 | 75 | 0 | 25 | 0 | Hundington 8610 457 g/m2 | 3680 | 4.2 | 39 | −0.11 |
| 5 | 100 | 0 | 0 | 0 | 0 | 0 | Hundington 8610 457 g/m2 | 4728 | 4.5 | 36 | −0.10 |
| 6 | 100 | 0 | 0 | 0 | 0 | 0 | Hundington 8610 457 g/m2 | 5488 | 5.2 | 49 | −0.13 |
| 7 | 0 | 0 | 0 | 90 | 0 | 10 | Hundington 8610 305 g/m2 | 2331 | 2.3 | 14 | −0.02 |

Examples 8-11

In examples 8-11 the same LDPE as described in Comparative Examples 12-24 was used. The LDPE was initially pulverized and subsequently made into pellets using the Pallmann Paltruder as described previously. The pellets were then subsequently pulverized into a powder before they were scattered onto the CDBP. In all cases a flexible fiberglass from a continuous strand roll commercially available as Huntingdon product 8610 at 305 g/m² from Huntingdon Fiberglass Products, LLC, of Huntingdon, Pa. was used unless otherwise noted. The LDPE powder was scattered onto the CDBP non-stick belt as well as the continuous strand fiberglass as described in Example 1 unless otherwise noted. For Example 8 the CDBP was set with heating zone 1 at 245° C. top and bottom. Heating zone two was set to 220° C. top and bottom, heading zone 3 was set to 180° C. top and bottom while the cooling zones were both set to 20° C. top and bottom. The first 15 cm diameter nip roller was set to 0.1 bar, the second 15 cm diameter nip roller was set to 2 bar, the third 15 cm diameter nip roller was set to 2 bar and the 61 cm diameter powered nip roller was set to 1.5 bar. The line speed was 3 m/minute. For Example 9 the two plastic panels from Example 8 were place on top of one another and run through the CDBP with both heating zones one and two set to 210° C. top and bottom. Heating zone three was set to 150° C. top and bottom. Both cooling zones were set to 20° C. top and bottom. 0.1 bar of pressure was applied at the first 15 cm diameter nip roller. The line speed was 3 m/minute. The scattering units were not used and no further LDPE as added to the sample. Also, no additional fiberglass was added. For Example 10, the plastic panel from Example 8 was used as a core material in place of the fiberglass. No additional fiberglass was added. Additional LDPE resin was scattered to both the top and bottom sides of the panel. The CDBP settings were the same as Example 9. For Example 11, the two plastic panels from Example 10 were place on top of one another and run through the CDBP with the heating zones one and two were both set to 210° C. top and bottom, heating zone 3 was set to 150° C. top and bottom and both cooling zones were set to 20 C top and bottom. 0.1 bar was applied at the first 15 cm diameter nip roller. The properties of the resultant thermoplastic composites are shown in Table 5.

TABLE 5

| Example | Fiberglass | Basis Weight (g/m2) | Thickness (mm) | TEC *10-6 m/(m*C) | Shrinkage (%) |
|---|---|---|---|---|---|
| 8 | Hundington 8610 305 g/m2 | 1692 | 1.6 | 8 | −0.01 |
| 9 | Hundington 8610 457 g/m2 | 3680 | 3.1 | 9 | −0.02 |
| 10 | Hundington 8610 457 g/m2 | 3340 | 3.3 | 28 | −0.05 |
| 11 | Hundington 8610 457 g/m2 | 6346 | 6.5 | 40 | −0.04 |

Although specific embodiments have been illustrated and described herein for purposes of description of the preferred embodiments, it will be appreciated by those of ordinary skill in the art that a wide variety of alternate or equivalent implementations calculated to achieve the same purposes may be substituted for the specific embodiments shown and described without departing from the scope of the present invention. This application is intended to cover any adaptations or variations of the preferred embodiments discussed herein. Therefore, it is manifestly intended that this invention be limited only by the claims and the equivalents thereof.

What is claimed is:

1. A substrate comprising: a thermoplastic composite having a fiberglass mat embedded in a thermoplastic resin, wherein the fiberglass mat has a basis weight of 76 to 500 g/m² and about 20 to about 3000 fiberglass intersections per cm², and wherein the thermoplastic composite possesses (i) a Thermal Expansion Coefficient of ⅓ or less than that of a substrate derived from a neat embodiment of the thermoplastic resin, or (ii) a Thermal Expansion Coefficient of $50*10^{-6}$ m/(m*° C.) or lower.

2. A substrate according to claim 1, wherein the thermoplastic composite has a Thermal Expansion Coefficient of $40*10^{-6}$ m/(m*° C.) or lower.

3. A substrate according to claim 1, wherein the thermoplastic composite meets the specification of flatness in the flooring industry, with gaps measured over a 45 cm span of less than 0.35 cm.

4. A substrate according to claim 1, further comprising one or more fillers in the thermoplastic composite.

5. A substrate according to claim 4, wherein the one or more fillers comprise cellulose, calcium carbonate, volcanic ash, expanded volcanic ash, wood flour or rice hulls.

6. A substrate according to claim 4, wherein the one or more fillers include a mineral filler or an organic filler.

7. A substrate according to claim 1, wherein the thermoplastic resin comprises a polyolefin and the thermoplastic composite has a thickness of 2 mm to 7 mm and a Thermal Expansion Coefficient of $50*10^{-6}$ m/(m*° C.) or lower.

8. A substrate according to claim 1, wherein the thermoplastic resin comprises a polypropylene, polyethylene, polyolefin copolymer, polyvinyl chloride, polyethylene terephthalate, polyamide, a polyolefin from a hydropulping process, or combination thereof.

9. A substrate according to claim 1, wherein the thermoplastic composite has a basis weight between 500 g/m² to 10,000 g/m².

10. A substrate according to claim 1, further comprising at least one additional layer bonded to the thermoplastic composite to form a multilayered article.

11. An article comprising a substrate derived from thermal compression bonding a thermoplastic resin with a fiberglass mat and optionally one or more fillers, wherein the fiberglass mat has a basis weight of 76 to 1250 g/m² and about 20 to about 3000 fiberglass intersections per cm², and wherein the thermoplastic composite possesses a Thermal Expansion Coefficient of ⅓ or less than that of a substrate derived from a neat embodiment of the thermoplastic resin, or (ii) a Thermal Expansion Coefficient of $50*10^{-6}$ m/(m*° C.) or lower.

12. A method comprising: (a) scattering a thermoplastic resin with optionally one or more fillers onto a fiberglass mat positioned on a first rotating belt, wherein the fiberglass mat has a weight of at least 76 up to 1250 g/m² and about 20 to about 3000 fiberglass intersections per cm² (b) thermal compression bonding the thermoplastic resin with optionally one or more fillers and the fiberglass mat between the first rotating belt with a second rotating belt to form a substrate, wherein the substrate possesses (i) a Thermal Expansion Coefficient of ⅓ or less than that of a substrate derived from a neat embodiment of the thermoplastic resin, or (ii) a Thermal Expansion Coefficient of $50*10^{-6}$ m/(m*° C.) or lower.

13. A method according to claim 12, wherein the substrate possesses a Thermal Expansion Coefficient of $40*10^{-6}$ m/(m*° C.) or lower.

14. A method according to claim 12, further comprising first scattering an additional layer of a thermoplastic resin with optionally one or more fillers onto the first rotating belt before positioning the fiberglass mat onto the first rotating belt.

15. A method according to claim 14, wherein the thermoplastic resin has a particle size of 0.05 cm to 0.5 cm.

16. A method according to claim 12, wherein thermal compression bonding is performed on a continuous double belt press.

17. A method according to claim 12, wherein the thermoplastic resin comprises a polypropylene, polyethylene, polyolefin copolymer, polyvinyl chloride, polyethylene terephthalate, polyamide, polyolefin from a hydropulping process, or combination thereof.

18. A method according to claim 12, further comprising treating a surface of the substrate.

19. A method according to claim 18, wherein treating comprises plasma treatment, corona treatment, silane treatment, use of primer materials or heat treatment.

20. A method according to claim 12, further comprising bonding at least one additional layer to the substrate to form a multilayered article.

* * * * *